Dec. 14, 1965  C. E. HEIN  3,222,885
RESILIENT COUPLING
Filed April 29, 1963
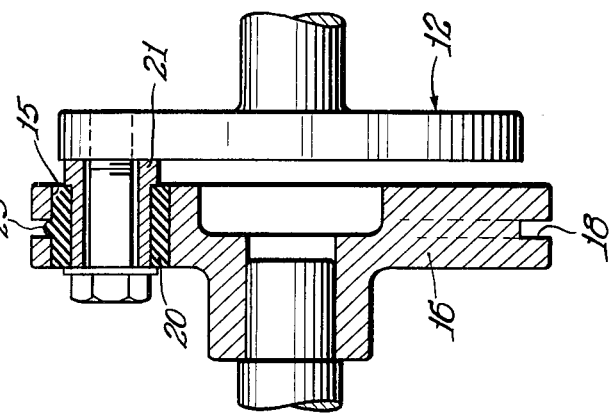
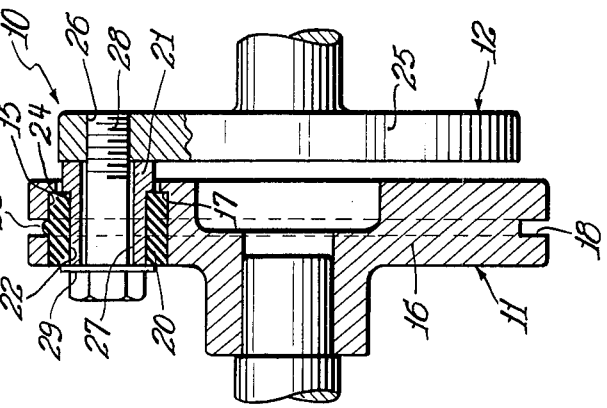
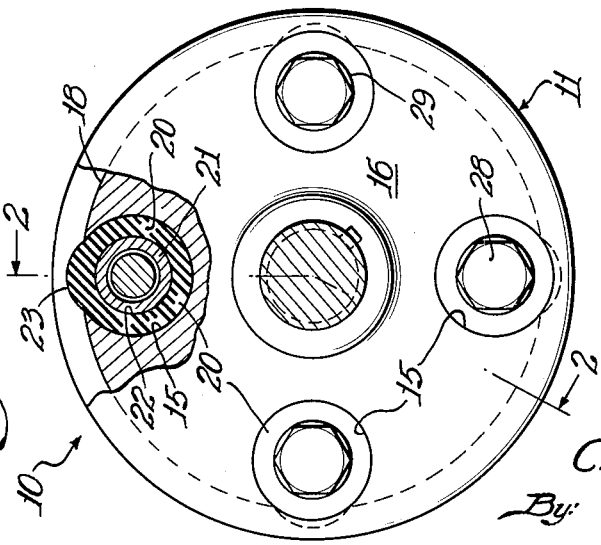
Inventor:
Charles E. Hein
By: Evan D. Roberts  Atty United States Patent Office 3,222,885
Patented Dec. 14, 1965

3,222,885
RESILIENT COUPLING
Charles E. Hein, Newfield, N.Y., assignor to Morse Chain Company, Ithaca, N.Y., a corporation of New York
Filed Apr. 29, 1963, Ser. No. 276,504
5 Claims. (Cl. 64—11)

This invention relates to a coupling or connecting device and more particularly to a coupling or connecting device utilizing a resilient element for transmitting load within the device.

In transmitting load between shafts or other elements it has been found highly desirable to interconnect the shaft, or other elements, by means of a coupling or other connection which utilizes one or more resilient connecting elements to reduce shock loading and to minimize the effects of misalignment of the elements to be interconnected. In doing this, it is necessary to provide a means for retaining the resilient members in the coupling or connection so that they are relatively free to deform to provide the required effects within the coupling. There have been many elaborate ways of retaining the resilient members in the coupling, but in many cases the structures involved are expensive and do not allow for ready replacement of the resilient members and the associated parts without adding considerably to the complexity and cost thereof. It is, therefore, extremely important to provide a coupling or connection provided with a resilient interconnecting element that is appropriately mounted to allow sufficient deformation and yet be readily replaceable, and to provide a coupling which is relatively economical to manufacture and maintain.

It is a primary object of this invention to provide a coupling or connection having a resilient interconnecting member that is appropriately anchored in the coupling or connection to deform to absorb irregularities in the load applied to the coupling or connection, and which is relatively simple and economic to construct and maintain.

A more particular object of this invention is to provide a coupling having a resilient interconnecting element frictionally retained in a socket in a hub element of the coupling solely by virtue of the cooperating structures of the resilient member and the hub element.

With these and other objects in view, the present invention contemplates a coupling or connecting structure having a resilient interconnecting element frictionally retained in either the drive or driven elements of the coupling or connection by a virtue of the cooperating configuration of the resilient element and the coupling or connecting element in which it is mounted.

Other objects and advantages of this invention will become apparent by reference to the following detailed description and the accompanying drawings wherein:

FIG. 1 is a partially sectioned end view of the coupling showing the shape of the resilient element.

FIG. 2 is a sectional view of the coupling taken along line 2—2 of FIG. 1 showing the position of the interconnecting structures of the coupling and the shape of the slot and the socket.

FIG. 3 is a sectional view similar to FIG. 2 showing a modification of the coupling socket.

For purposes of explanation, the present invention is illustrated in FIGS. 1–3 as applied to a torque transmitting coupling generally designated by the numeral 10. It should be noted that the invention is not necessarily limited to couplings or connectors of this type. The coupling 10 includes, among other things, members 11 and 12 which, for purposes of illustration, will be defined as a drive hub member 11 and driven hub member 12 respectively.

The drive member 11 is provided with four axial sockets 15 positioned radially in a flange portion 16 of the drive hub member 11. The sockets 15 are illustrated as basically conventional circular cylindrical sockets (FIGS. 1–3) although other shapes could be utilized. The conventional sockets 15 extend axially only part way through the flange 16 leaving a shoulder 17. A slot 18 is formed in the periphery of the drive hub member 11 to a depth such that the slot 18 opens into the sockets 15 along the outer portion of the socket 15. The slot can be easily formed on the drive member 11 when the periphery thereof is formed.

A resilient element 20 made of rubber or other similar material having an external dimension greater than the diameter of the socket 15 is forced under radial compression into each of the sockets 15. The elements 20 are each provided with an axial bushing 21 which may be slip fitted into an axial passage 22 in the resilient element 20. The bushings 21 support respective elements 20 and prevent the elements from deforming radially inward when the elements 20 are compressibly positioned in the respective sockets 15. Each of the bushings 21 is provided with a shoulder 24 for axially receiving the element 20. Inasmuch as the resilient elements 20 are compressibly positioned in the sockets 15, a portion of the resilient element adjacent the slot 18 will expand into the slot and form a bulge 23 (FIGS. 1–3) within the slot and thereby act to tend to prevent axial movement of the resilient elements 20 in the respective sockets 15.

It should be noted that there is no other positive means for retaining the element 20 in the socket 15 and, therefore, the element 20 can be removed from the socket for replacement by applying an extreme and abnormal axial force to the resilient member 20. Further, it should be noted that a slot could be formed around the inside of the socket 15 that would provide a similar bulge effect to resist axial movement of elements 20, but the machining of such a slot would be more expensive than the slot 18 shown ni FIGS. 1–3.

The driven hub member 12 includes, among other things, a flange portion 25 having four axial threaded apertures 26 substantially aligned with apertures 27 in the bushings 21. A separate bolt 28 is inserted through a washer 29, the aperture 27 of each of the bushings 21, and threaded into respective apertures 26 to lock the bushings 21 to the driven hub flange portion 25 to interconnect the drive and driven hub members 11 and 12 through the resilient elements 20. The resilient elements 20 are held against axial movement on the bushings 21 by the bushing shoulder 24 and the washer 29.

Another embodiment of this invention is illustrated in FIG. 3 and shows, among other things, that the present invention eliminates the need for the shoulder 17 by indicating that the socket 15 may extend axially clear through the flange 16. This is possible, inasmuch as the bulge 23 of the resilient elements 20 is quite sufficient by itself for holding the elements 20 against axial movement. This manifests a great saving in the cost of production of the drive hub member sockets 15 and further illustrates the effectiveness of the axial resistance to separation of the coupling provided by the present invention.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. A coupling comprising a drive member, a driven member, one of said members having a straight-sided axial socket therein, said socket member having a slot in the outer periphery thereof opening into said socket, a straight-sided resilient element having a dimension different than the dimension of said socket so as to be deformed when inserted in the socket and thereby frictionally retained in the socket with a portion of said element expanded into the slot to tend to retain said resilient element against movement of said element in the socket, and means for connecting said element to said other member to provide a resilient coupling connection between said members.

2. A coupling comprising a drive member, a driven member, one of said members having a straight-sided socket extending axially straight through said member, said socket member having a slot in the outer periphery thereof opening into said socket and adapted to receive an expanded portion of a resilient element compressibly fitted into the socket, a straight-sided resilient element adapted to be compressibly fitted into the socket, and means for connecting said element to said other member to provide a resilient coupling connection between said members.

3. A coupling comprising a drive member, a driven member, one of said members having a straight-sided axial socket therein, said socket member having a slot in the outer periphery thereof opening into said socket and adapted to receive an expanded portion of a resilient element compressibly fitted into the socket, a straight-sided resilient element adapted to be compressibly fitted into the socket, and means for connecting said element to said other member to provide a resilient coupling connection between said members.

4. A coupling comprising a drive member, a driven member, one of said members having a straight-sided socket extending axially straight through said member, said socket member having a slot in the outer periphery thereof opening into said socket and adapted to receive an expanded portion of a resilient element compressibly fitted into the socket, a straight-sided resilient element adapted to be compressibly fitted into the socket, and means for connecting said element to said other member to provide a resilient coupling connection between said members.

5. A coupling comprising a drive member, a driven member, one of said members having a straight-sided axial socket in the outer periphery thereof, a shoulder formed on said socket member extending into the socket, said socket member having a slot therein opening into said socket and adapted to receive an expanded portion of a resilient element compressibly fitted into the socket, a straight-sided resilient element adapted to be compressibly fitted into the socket against said shoulder, and means for connecting said element to said other member to provide a resilient coupling connection between said members.

References Cited by the Examiner
UNITED STATES PATENTS

| | | | |
|---|---|---|---|
| 764,103 | 7/1904 | Baehr | 64—11 |
| 2,622,418 | 12/1952 | Howison | 64—11.10 |
| 2,852,286 | 9/1958 | Guy et al. | 64—11.10 |
| 2,930,211 | 3/1960 | Guy | 64—11 |
| 3,058,321 | 10/1962 | Aske | 64—11 |

BROUGHTON G. DURHAM, *Primary Examiner.*

ROBERT C. RIORDON, *Examiner.*